US009643857B2

United States Patent
Zhao et al.

(10) Patent No.: US 9,643,857 B2
(45) Date of Patent: *May 9, 2017

(54) METHODS OF PREPARING HIGH PURITY ALUMINUM HYDROXIDE AND HIGH PURITY ALUMINUM OXIDE

(71) Applicant: Shanghai PhiChem Material Co., Ltd., Shanghai (CN)

(72) Inventors: Bing Zhao, Shanghai (CN); Yun Zhang, Shanghai (CN); Yinsheng Wang, Shangai (CN); Jinshan Zhang, Dublin, CA (US)

(73) Assignee: Shanghai Phichem Material Co., Ltd., Shanghai (CN)

( * ) Notice: Subject to any disclaimer, the term of this patent is extended or adjusted under 35 U.S.C. 154(b) by 46 days.

This patent is subject to a terminal disclaimer.

(21) Appl. No.: 14/640,525

(22) Filed: Mar. 6, 2015

(65) Prior Publication Data

US 2016/0115041 A1    Apr. 28, 2016

(30) Foreign Application Priority Data

Oct. 28, 2014 (CN) .......................... 2014 1 0588696

(51) Int. Cl.
C01F 7/00 (2006.01)
C01F 7/42 (2006.01)
C01F 7/44 (2006.01)

(52) U.S. Cl.
CPC .............. C01F 7/42 (2013.01); C01F 7/428 (2013.01); C01F 7/441 (2013.01); C01P 2006/80 (2013.01)

(58) Field of Classification Search
CPC ...... C01F 7/30; C01F 7/42; C01F 7/46; C01F 7/428
USPC ....................................... 423/627, 625, 629
See application file for complete search history.

(56) References Cited

U.S. PATENT DOCUMENTS

| 2,746,842 A * | 5/1956 | Bloch | C01F 7/428 423/627 |
| 2,947,056 A | 8/1960 | Csordas et al. | |
| 3,003,952 A * | 10/1961 | Cramer | B01J 21/04 208/138 |
| 3,429,660 A * | 2/1969 | Cornely | C01F 7/428 423/626 |
| 3,488,147 A * | 1/1970 | Cornely | C01F 7/428 423/627 |
| 3,494,733 A * | 2/1970 | Cornely | B01J 21/04 423/627 |
| 4,615,875 A * | 10/1986 | Gonczy | C01F 7/428 423/626 |
| 5,225,229 A * | 7/1993 | Martin | C01F 7/144 423/625 |
| 9,145,305 B2 * | 9/2015 | Zhao | C01F 7/428 |
| 2012/0171450 A1 | 7/2012 | Ozaki et al. | |

FOREIGN PATENT DOCUMENTS

CN  101913636  12/2011
CN  104250017  12/2014

OTHER PUBLICATIONS

Olszyna A.R. et al: "Sintering of High-Density, High-Purity Alumina Ceramics", Ceramics International Elevier, Amsterdam NL. vol. 23, No. 4, 1997, pp. 323-328.

* cited by examiner

*Primary Examiner* — Steven Bos
(74) *Attorney, Agent, or Firm* — Fox Rothschild LLP

(57) ABSTRACT

This application discloses methods and processes for preparation of high purity aluminum hydroxide and high purity aluminum oxide. The method of preparing high purity aluminum hydroxide involves reacting aluminum with water in the presence of one or more catalysts and one or more complexing agents that can react with non-aluminum metal impurities to form soluble complexes for effective removal through rinsing.

26 Claims, No Drawings

METHODS OF PREPARING HIGH PURITY ALUMINUM HYDROXIDE AND HIGH PURITY ALUMINUM OXIDE

CROSS REFERENCE TO RELATED APPLICATIONS

This application claims priority under 35 U.S.C. §119(a) to Chinese Patent Application No. 201410588696.4, filed on Oct. 28, 2014, which is herein incorporated by reference in its entirety.

FIELD OF THE INVENTION

The present invention relates to chemical engineering materials and methods of preparation, in particular methods and processes for preparing high purity aluminum hydroxide and high purity aluminum oxide.

BACKGROUND OF THE INVENTION

High purity aluminum hydroxide is a high value-added powdery product, with purity at 99.9%-99.9999%. High purity aluminum hydroxide is currently a new type functional and structural material widely used in the fields of chemical engineering, coatings, construction, transportation and electronic apparatus, etc. For high purity aluminum hydroxide used as the starting material to make high purity aluminum oxide, its content of metal element impurities (include silicon) should be no more than 0.0005%.

Currently the major methods to produce high purity aluminum hydroxide include seeding-separation method, carbon separation method, and precipitation method:

A) Seeding Separation Method: a method to make micro-powdery aluminum hydroxide, using a sodium chlorate solution as the starting material, adding aluminum hydroxide crystal seeds for a seeding-separation treatment, followed by separating solid from the starting liquid materials, and rinsing and drying the isolated solid to obtain the product.

B) Carbon Separation Method: a method to make aluminum hydroxide, using a sintering refined solution as the starting material for the first-phase carbon separation degradation with addition of crystal seeds, filtering the resultant slurry to obtain the first-phase aluminum hydroxide; and then mixing the first-phase aluminum hydroxide with the sintering refined solution for the second-phase carbon separation degradation with addition of crystal seeds. The resultant slurry from the second-phase carbon separation degradation with addition of crystal seeds is then washed with soft water, filtered, and dried to obtain the finished aluminum hydroxide product.

C) Precipitation Method: a method to make aluminum hydroxide, including the homogeneous precipitation synthesis method and heterogeneous precipitation azeotropic distillation method, using an aluminum salt solution and an alkaline solution as starting materials, adding a small amount of polymer protection agent, such as polyethylene glycol or polyvinyl alcohol, through a homogenous precipitation reaction in a homogenizing emulsification reactor to obtain an aluminum hydroxide suspension. The aluminum hydroxide suspension goes through post-treatment to yield a filter cake; the filter cake is added into an n-butanol azeotropic solvent; then azeotropic distillation of the resultant solution yields an aluminum hydroxide gel; and finally the resultant aluminum hydroxide gel is dried to yield aluminum hydroxide powders.

Aluminum oxide is an important chemical engineering starting material, and aluminum oxide with purity above 99.99% is called high purity aluminum oxide, having various superior properties, such as high purity, low surface area, high light absorption, strong resistance to corrosion, strong resistance to wear, tolerance of high temperature, high Mohs hardness, and good insulation, etc., and can be used in the manufacture of high temperature resistant material, crucible, porcelain, artificial gemstones, phosphor materials, high pressure sodium light, special porcelain, YAG laser crystal parts and integrated circuit boards, etc.

The purity of aluminum oxide is an important parameter affecting the quality of sapphire crystals, among which, the low purity of aluminum oxide will result in the following effects: first, it will cause defects of sapphire crystals such as dislocation, bubbles, inclusions and cracks. These defects can usually absorb, scatter, reflect, or diffract magnetic, light, sound, and electric energies generated inside the crystals or inputted from outside of the crystals, thus affecting overall quality of the sapphire crystals and properties of LED products. Second, high content of metal element impurities in aluminum oxide starting material will cause discoloring of the sapphire crystals. Therefore, the growth of high quality sapphire crystals has put higher requirements on the purity of the aluminum oxide, in general, with the content of metal element impurities (including silicon) being no more than 0.001%.

In the process of achieving the present invention, the inventors discovered that the existing techniques contain at least the following issues.

The metal impurity content in the aluminum hydroxide product is too high, with the content of common metal element impurities (including silicon) exceeding the 0.0005% requirement.

Aluminum oxide is usually prepared by the base method, acid method, acid-base combination method, and heat method, etc., and thus prepared industrial aluminum oxide contains relatively high concentration of other metal impurities, with purity generally low, which can only reach 99% purity. The existing techniques use de-ionized water, hydrochloric acid, and hydrofluoric acid to wash the aluminum oxide to remove some specific metal impurities, which cannot remove metal ions below 10 ppm; and the content of common metal element impurities (including silicon) after purification exceeds 0.001% in aluminum oxide, which cannot reach the purity requirement, and purification result is poor. In addition, the existing techniques involve complex processes to operate, with high energy consumption and high cost, and are likely to cause pollutions to the environment.

SUMMARY OF THE INVENTION

The present invention provides a preparation method and process for high purity aluminum hydroxide and high purity aluminum oxide. High purity aluminum hydroxide is prepared by reacting aluminum with water in the presence of one or more catalysts and one or more complexing agents, which can react with non-aluminum metal impurities to form soluble complexes for effective removal through rinsing.

In one embodiment, the method includes the steps of: first, in the presence of catalysts and complexing agents, mixing aluminum starting material and water, allowing them to react at 30-99.9° C. for 1-168 hours, to form an aluminum hydroxide suspension; then, filtering, rinsing, and drying the aluminum hydroxide suspension to form high purity aluminum hydroxide. Sintering the high purity aluminum hydroxide prepared according to the present invention produces aluminum oxide. The aluminum oxide is rinsed with washing solution for 10 minutes to 100 hours with the mass ratio of aluminum oxide:washing solution at 1:1-1:100, then filtered and dried to yield high purity aluminum oxide. The high purity aluminum hydroxide prepared by this method meets the requirement that the total mass of non-aluminum metal elements plus silicon be no more than 0.0005% in the aluminum hydroxide, which can be used as starting material for manufacture of high purity aluminum oxide. The high purity aluminum oxide prepared by the present method has high purity and meets the requirement that the sum of non-aluminum metals plus silicon element impurity be no more than 0.001% by mass, and moreover the manufacture process is simple with a low cost and no environmental pollutions.

To overcome the shortcomings associated with the existing techniques, in one aspect, the present invention provides a method to prepare high purity aluminum hydroxide, the method comprising the steps of:

(1) in the presence of one or more catalysts and one or more complexing agents, mixing starting material aluminum with water, at 30-99.9° C., and stirring the mixture for 1-168 hours to yield an aluminum hydroxide suspension; the reaction system includes starting material aluminum, the catalyst(s), complexing agent(s), and water, among which the mass of starting material aluminum, catalyst(s), and complexing agent(s) are 1%-30%, 0.05%-10%, 0.05%-20%, respectively, of the total reaction mixture, and the remaining is water;

(2) filtering the aluminum hydroxide suspension from step (1), rinsing, and drying to obtain a high purity aluminum hydroxide solid.

In one embodiment, the starting material aluminum is selected from aluminum sheets, aluminum chips, aluminum powder, aluminum scraps, aluminum wire, and aluminum ingots, and combinations thereof.

In one embodiment, the selected starting material aluminum contains 99.95%-100% of aluminum by weight.

In one embodiment, the catalyst is quaternary ammonium hydroxide base with a molecular formula of $R^1R^2R^3R^4N^+OH^-$, wherein $R^1$, $R^2$, $R^3$, and $R^4$ are same or different and are each independently alkyl or aryl, and the content of the non-aluminum metal impurities in the catalyst is less than 10 ppm by weight.

In one embodiment, the catalyst is selected from tetramethylammonium hydroxide, tetraethyl ammonium hydroxide, tetrapropylammonium hydroxide, (2-hydroxyethyl)-trimethylammonium hydroxide, benzyltrimethylammonium hydroxide, and trimethylphenylammonium hydroxide, and combinations thereof.

In one embodiment, the complexing agent is selected from inorganic and organic complexing agents, and combinations thereof.

In one embodiment, the inorganic complexing agent is selected from HCl, $NH_4SCN$, $NH_4F$, $NH_3$, polycyanic acids, polycyanates, pyrophosphates, and polyphosphates, a combination thereof.

In one embodiment, the organic complexing agent is selected from amino-carboxylic acid complexing agents, hydroxyl amino-carboxylic acid complexing agents, carboxylic acid complexing agents, alcohol amine complexing agents, and polymeric complexing agents, and combinations thereof.

In a preferred embodiment, said amino-carboxylic acid complexing agent is selected from ethylenediaminetetraacetic acid (EDTA), ethylenediaminetetraacetate salts (EDTA salts), diethylenetriaminepentaacetic acid (DTPA), diethylenetriaminepentaacetate salts (DTPA salts), nitrilotriacetic acid, and nitrilotriacetate salts (e.g., sodium or potassium salts), and combinations thereof; said hydroxyl aminocarboxylic acid complexing agent is selected from hydroxylethylene diamine tetraacetic acid (HEDTA), ethylene glycol bis(β-diaminoethyl) ether N,N,N',N'-tetraacetic acid, and dihydroxyglycine, and combinations thereof; said carboxylic acid complexing agent is selected from oxalic acid, tartaric acid, citric acid, gluconic acid, carboxylmethyl hydroxyl malonic acid, and hydroxyethyl amino acetic acid, and combinations thereof; said alcohol amine complexing agent is selected from diethanolamine and triethanolamine, and combinations thereof; and said polymeric complexing agent is selected from poly(4-hydroxy-tetramethylene-1,2-dicarboxylic acid) and poly(tetramethylene-1,2,4-tricarboxylic acid), and combinations thereof.

Specifically, drying uses drying oven, drying room, flash evaporation drying equipment and microwave drying equipment and combination thereof.

Specifically, use plate-frame pressure filter, centrifuge and bag filter or combination thereof for filtration to yield the filter cake; use deionized water to wash the filter cake, to remove residual organic bases and complexing agents in the filter cake, the mass ratio of the deionized water to filter cake is 1:1-1:100; and blow dry the washed filter cake.

In another aspect, the present invention provides a method to prepare high purity aluminum oxide, which includes:

(1) calcining the high purity aluminum hydroxide prepared by the method of the present invention to yield aluminum oxide.

(2) washing the aluminum oxide from step (1) with a washing liquid, followed by filtration and drying, to yield high purity aluminum oxide. Washing time is dependent on various factors, such as the scale of the reaction, and type and amount of washing liquid used. In one embodiment, the washing time is from about 10 minutes to 6 hours, and the mass ratio of the aluminum oxide to the washing liquid is from 1:1 to about 1:100.

Similarly, the calcining temperature and time are also dependent on various factors such as the scale of the reaction, and can be adjusted so that all the aluminum hydroxide is dehydrated to become aluminum oxide. In one embodiment, the calcining temperature is in the range of about 400° C. to about 1700° C., and calcining time is from about 0.5 hours to about 168 hours.

In one embodiment, the washing liquid is selected from deionized water, inorganic acid solutions, organic acid solutions, organic base solutions, salt solutions where the cations are non-metal cations, and aromatic hydrocarbon, and combinations thereof.

In one embodiment, drying involves use of drying oven, drying room, flash evaporation drying apparatus, or microwave drying apparatus, and any combinations thereof.

Thus, in a typical embodiment of the present invention, high purity aluminum hydroxide is prepared by the steps of: (1) reacting starting material aluminum with water in the presence of catalyst(s) and complexing agent(s), allowing the reaction to take place until all the aluminum is consumed, which typically takes about 1-168 hours at 30-99.9° C., to yield an aluminum hydroxide suspension; and (2) then filtering to collect aluminum hydroxide solid, rinsing it with a rinsing liquid, and drying to obtain a high purity aluminum hydroxide product, which typically meets the purity of containing the total amount of non-aluminum metal elements and silicon element no more than 0.0005% in mass of the product. Calcining the high purity aluminum hydroxide prepared by the method of the present invention provides aluminum oxide, washing the aluminum oxide with a washing liquid, followed by filtration and drying, provides high purity aluminum oxide, which meets purity of containing the total amount of non-aluminum metal elements and silicon element no more than 0.001% in mass of the product.

The beneficial effects of the technical solution provided by the present invention include, among others, simple preparation processes, low costs, and no environmental pollutions.

Other aspects or preferred embodiments of the present invention may include any suitable combinations of the embodiments disclosed herein. Yet other aspects and embodiments may be found in other parts of the description provided herein.

DETAILED DESCRIPTION OF THE INVENTION

To further clarify the object, technical schemes and advantages of the present invention, detailed description of certain embodiments of the present invention are provided below.

In one aspect the present invention provides a method to prepare high purity aluminum hydroxide, the method comprising the steps of:

Step 1, in the presence of one or more catalysts and one or more complexing agents, mix starting material aluminum with water, at 30-99.9° C., wherein the aluminum metal reacts with water to form aluminum hydroxide, and let the reaction to continue until completion, which takes about 1-168 hours, to obtain an aluminum hydroxide suspension. While not intended to be limiting, the reaction system typically contains starting material aluminum, catalyst(s), complexing agent(s) and water, and the masses of the starting material aluminum, catalyst(s), and complexing agent(s) are in the range of about 1%-30%, about 0.05%-10%, and about 0.05%-20%, respectively by weight, of the total reaction mixture, and the remaining mass is that of water.

Step 2, filter the aluminum hydroxide suspension from step (1) to obtain a filter cake, rinse with a rinsing liquid, and dry the filter cake to obtain a high purity aluminum hydroxide product.

In the working examples of the present invention, the equation of the hydrolysis reaction in Step (1) is illustrated below:

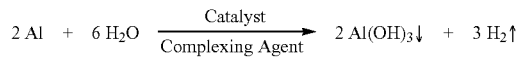

Aluminum is thoroughly mixed with deionized water in the presence of catalyst(s) and complexing agent(s), under the condition of adequate agitation, while the temperature of the reaction system is controlled in the range of 30-99.9° C.; and after 1-168 hours of the reaction time, an aluminum hydroxide suspension is produced.

In the working examples, the aluminum starting material is required to have certain purity, with the content of the aluminum element being 99.95%-100% by weight of the aluminum starting material.

Commercially available industrial aluminum hydroxide starting material can reach a purity of 99.99% to 99.996%, even 99.998%. However, for preparing high purity aluminum oxide, the purity of aluminum hydroxide is required to reach 99.9995%, even above 99.9995%, thus, in the preparation of high purity aluminum hydroxide, the content of other non-aluminum metals in the aluminum starting material is required to be less than 0.05% by weight. For other metal impurities in aluminum starting material, in general, only the total content of impurities and the contents of a few common metals, such as Fe, Cu, Zn, Ti, are controlled. Specifically, in the present invention, the main metal impurities monitored and tested include Fe, Na, K, Ca, Mn, Zn, Cu, V, Cr, Ti, Ni, and Mg, and particularly Fe, Na, K, Ca, Mg, Cu, Zn, and Ni.

The requirements for the shape of aluminum in the present invention are rather broad. The aluminum starting material is selected from aluminum sheet, aluminum chips, aluminum ingots, aluminum powder, aluminum scraps, and aluminum wires, or combinations thereof. There is no specific requirement on aluminum starting material size; it will be suitable as long as it has large enough surface area to enable sufficient agitation during solid/liquid reaction. In general, aluminum sheet length is no more than 10 cm, width is no more than 5 cm, and thickness is no more than 2 cm; each aluminum chip mass is no more than 8 g, and particle size is no less than 1 μm in diameter; the particle size of aluminum powder is no more than 1 μm in diameter; each aluminum scrap mass is no more than 8 g; aluminum wire diameter is no more than 2 cm, and aluminum wire length is no more than 20 cm. The mass of starting material aluminum is in the range of about 1%-30% of the total mass of the reaction system.

In the working examples of the present invention, the catalyst is a quaternary ammonium hydroxide base(s), and the structural formula of the quaternary ammonium bases is $R^1R^2R^3R^4N^+OH^-$, whose structure is represented below:

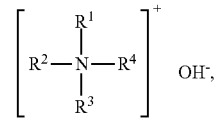

wherein $R^1$, $R^2$, $R^3$, and $R^4$ are same or different, each independently alkyl or aryl. The above catalyst participates in the hydrolysis reaction listed in Step (1) of the working examples of the present invention, as illustrated in the following equations:

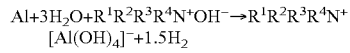

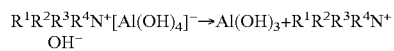

The quaternary ammonium hydroxide base is selected from tetramethylammonium hydroxide [$(CH_3)_4N^+OH^-$], tetraethylammonium hydroxide [$(CH_3CH_2)_4N^+OH^-$], tetrapropylammonium hydroxide [$(CH_3CH_2CH_2)_4N^+OH^-$], (2-hydroxyethyl)-trimehylammonium hydroxide [$(CH_3)_3(HOCH_2CH_2)N^+OH^-$], benzyltrimethylammonium hydroxide [$C_6H_5CH_2(CH_3)_3N^+OH^-$], trimethylphenylammonium hydroxide [$(CH_3)_3C_6H_5N^+OH^-$], and combinations thereof.

Strict control of the purity of the catalyst(s) can effectively reduce the amount of impurities in the product; thus, the content of non-aluminum metal impurities in the quaternary ammonium hydroxide base(s) used in the working examples of the present invention is less than 10 ppm by weight, and the amount of the quaternary ammonium hydroxide base(s) is 0.05%-10% by weight of the total reaction system weight.

To improve the purity of the high purity aluminum hydroxide product, in the working examples of the present invention, the non-aluminum metal ions were removed through using complexing agent(s) to form complex(es) with the non-aluminum metal ions.

Through forming complexes between the complexing agents and metal ions, either forming simple complex compounds or chelate compounds, the complexed ions lose their free metal ion characteristics.

The formation of a complex is an equilibrium reaction, the higher the stability constant logarithm (IgK) of a complex is, and the lower the concentrations of the original complexing agent and metal ions from dissociation of the complex are, the more stable the complex is, and the equilibrium reaction takes place towards the direction of forming the complex. Therefore, the logarithm value of a complex stability constant (IgK) can be used as an indication of complexation efficiency of a complexing agent towards various types of metal ions. In a solution containing various types of metal ions, if the amount of the complexing agent is not sufficient to form complexes with all the metal ions, then the complexes with the highest IgK will form preferably, then complex with the next highest IgK will form the second, while complexes with low IgK's may not form or only form a small amount. Therefore, the formation of complexes, in principle, proceeds based on the sequence of IgK value, and complete complexation is possible only when there is a sufficient or excess amount of the complexing agent. In another situation, when a second complexing agent is added to a solution containing a complex, if the complex stability constant of the complex formed between the later added complexing agent with the metal ion in the existing complex is smaller than that of the existing complex, then the complex with the original complexing agent will not change and remain in the solution; on the other hand, if the complex stability constant of the complex formed between the later added complexing agent and the metal ion is higher than that of the original complexing agent, then the original complex will dissociate gradually to release free metal ions, and the released free metal ions will be complexed with the later added complexing agent to form a new complex, and the reaction will proceed until the solution contains completely the complex formed from the latter added complexing agent, while the original complexing agent is released.

While not intended to be limiting, Table 1 lists IgK values of the complexes formed from various metal ions with four different types of complexing agents to illustrate certain aspects of the present invention.

TABLE 1

Stability constant (lgK) of several types of complexes

| Metal Ions | NTA | HEDTA | EDTA | DTPA |
|---|---|---|---|---|
| $Fe^{3+}$ | 15.87 | 19.87 | 25.1 | 28.6 |
| $Gd^{3+}$ | 11.54 | 15.31 | 17.10 | 22.46 |
| $Sn^{3+}$ | 11.51 | 15.39 | 16.90 | 22.34 |
| $Ce^{3+}$ | 10.83 | 14.19 | 15.80 | 20.50 |
| $Cu^{2+}$ | 13.16 | 17.55 | 18.79 | 21.10 |
| $Ni^{2+}$ | 11.54 | 17.00 | 18.56 | 20.21 |
| $Pb^{2+}$ | 11.39 | 15.50 | 18.30 | 18.60 |
| $Zn^{2+}$ | 10.66 | 14.50 | 16.69 | 18.30 |
| $Co^{2+}$ | 10.40 | 14.40 | 16.21 | 18.40 |
| $Cd^{2+}$ | 9.80 | 13.00 | 16.61 | 18.93 |
| $Fe^{2+}$ | 8.83 | 11.60 | 14.33 | 16.55 |
| $Mn^{2+}$ | 7.44 | 10.70 | 13.98 | 15.50 |
| $Ca^{2+}$ | 6.56 | 8.51 | 10.85 | 10.74 |
| $Mg^{2+}$ | 5.41 | 7.00 | 8.69 | 9.02 |
| $Sr^{2+}$ | 4.98 | 6.80 | 8.63 | 9.68 |

TABLE 1-continued

Stability constant (lgK) of several types of complexes

| Metal Ions | NTA | HEDTA | EDTA | DTPA |
|---|---|---|---|---|
| $Ba^{2+}$ | 4.82 | 6.20 | 7.76 | 8.63 |
| $Ag^+$ | 5.40 | | 7.30 | |
| $Na^+$ | 2.15 | | 1.66 | |

Note:
HEDTA—hydroxyethylenediamine tetraacetic acid;
DTPA—diethylenetriamine pentaacetice acid.

Therefore, in the process of making aluminum hydroxide, it is necessary to use a specific complexing agent or a combination of multiple complexing agents to achieve the purity requirement of the high purity aluminum hydroxide. In the present invention, the common metal impurities that are of major concern and are tested include Fe, Na, K, Ca, Mn, Zn, Cu, V, Cr, Ti, Ni, and Mg; particularly, Fe, Na, K, Ca, Mg, Cu, and Zn are of major concern.

The complexing agent(s) is(are) selected from inorganic complexing agents and organic complexing agents, or a combination thereof, and the total amount of the complexing agent(s) used is in the range of from about 0.05% to about 20% by mass of the total mass of the reaction system (the reaction system includes catalyst(s), complexing agent(s), aluminum starting material, and water).

The inorganic complexing agent(s) can form regular complexes with metal ions, their complexing abilities are moderate and can form complexes that are stable at high temperature with heavy metal ions and alkaline earth metal ions. In one embodiment, in the working examples of the present invention, according to the components and contents of the metal impurities in the reaction system, the inorganic complexing agent is selected from HCl, $NH_4SCN$, $NH_4F$, $NH_3$, polycyanic acids, polycyanates, pyrophosphates, and polphosphates, and combinations thereof.

The organic complexing agent(s) is(are) selected from amino-carboxylic acids, hydroxyl amino-carboxylic acids, carboxylic acids, alcohol amines, and polymers, and combinations thereof.

Among these, the amino-carboxylic acid type of complexing agents can form chelates with metal ions, and their complexing abilities are strong and their complexes have high complex stability constants; therefore, they can form complexes with the metal ions in a reaction solution that are already complexed, and they have especially strong chelating ability with Ca, Mg and heavy metal ions to form chelate ring structures. Specifically, in the working examples of the present invention, based on the components and contents of the metal impurities in the reaction system, the amino-carboxylic acid complexing agents are selected from ethylene diaminetetraacetic acid, ethylenediaminetetraacetic acid salt, diethylenetriaminepenta acetic acid, diethylenetriaminepentaacetic acid salt, and nitrilotriacetic acid sodium salt, and combinations thereof.

Hydroxyl amino-carboxylic acids can also form stable chelates with metal ions. Specifically, in the working examples of the present invention, based on the component and content of the metal impurities in the reaction system, the hydroxyl amino-carboxylic acid complexing agent is selected from hydroxyethylenediaminetetraacetic acid, ethylene glycol bis(β-diaminoethyl) ether N,N,N',N'-tetraacetic acid, and dihydroxyglycine, and combinations thereof.

Specifically, in the working examples of the present invention, based on the components and content of the metal impurities in the reaction system, the carboxylic acid complexing agents are selected from oxalic acid, tartaric acid, citric acid, gluconic acid, 2-hydroxyl-2-(hydroxycarbonyl-methyl)malonic acid, and 2-(hydroxyethyl)aminoacetic acid, and combinations thereof. Among these, the chelating capability of the tartaric acid is relatively weak, while oxalic acid and gluconic acid belong to strong chelating agent, especially the gluconic acid is a good versatile chelating agent; tartaric acid can also chelate with most divalent and trivalent metal ions, and the ability of oxalic acid to chelate with calcium ion is also rather good.

The alcohol-amine type complexing agents can complex with $Fe^{3+}$ in basic solutions, giving excellent results. Specifically, in the working examples of the present invention, the alcohol amine complexing agent is selected from diethanolamine, triethanolamine, and their combinations.

Polymers formed from co-polymerization of carboxyl-containing monomers, such as acrylic acid, methacrylic acid, 2,3-dimethyl succinic acid, malonic acid, itaconic acid, and maleic anhydride, under certain conditions can play a similar role to that of a complexing agent. Their main role is to prevent precipitation caused by alkaline earth metals, and they can be used alone or along with other complexing agents. Specifically, in the working examples of the present invention, the polymer complexing agent is selected from poly(4-hydroxytetramethylene-1,2-dicarboxylic acid) (CP2), poly(tetramethylene-1,2,4-tricarboxylic acid) (CP4), and their combinations.

Complexing agents should be selected according to the conditions of use and properties of the complexing agents, in general, giving an overall consideration from the respects such as cost, ease of waste water treatment, high or low temperature of use, pH value of the solution, sensitivity to hydrolysis, and metal ions that need to be complexed, and so on. As far as cost is concerned, inorganic salts have the lowest cost, followed by polymers and organic acids, whereas amino-carboxylic acid and phosphate ester salts have higher cost; in terms of stability to hydrolysis, polyphosphates have the highest sensitivity to hydrolysis, while the amino-carboxylic acid salts have relatively higher stability to hydrolysis; in terms of temperature, complexing stability constant generally decreases with increasing temperature, but the extent of effect is not huge, so the temperature effect can be ignored.

Another important factor to consider when selecting a complexing agent is the pH value of the solution. The same complexing agent has very different complexing capabilities in different pH solutions, so when the pH value is different, the complexing capability of the same complexing agent with the same metal ion is not the same. Thus, based on the type and content of metal ions in a solution, the solution pH is also a factor for consideration when selecting a complexing agent. The effective pH ranges for complexation of certain complexing agents with various metal ions are shown in Table 2, which is used solely to illustrate the present invention, but it is not intended to limit the scope of the present invention.

TABLE 2

Effective complexation pH range of some complexing agents with metal ions

| Complexing Agent | Effective pH Range | | |
|---|---|---|---|
| | $Ca^{2+}$, $Mg^{2+}$ | $Fe^{3+}$ | Heavy Metal Ions |
| DTPA(5$Na^+$) | 6~14 | 1~11 | 2~12 |
| HEDTA(3$Na^+$) | 7~14 | 1~12 | 2~10 |
| NTA(3$Na^+$) | 9~14 | 2~7 | 3~10 |

Notes:
DTPA—diethylenetriaminepentaacetice acid;
HEDTA—hydroxyethylenediaminetetraacetic acid;
NTA—nitrilotriacetic acid sodium salt.

In one embodiment of the present invention, the pH of the reaction system is greater than 7, i.e., before the start of the reaction, after adding aluminum, catalyst(s), and complexing agent(s) into the deionized water, the pH of the liquid in the reactor is greater than 7, in accordance with the effective pH range of the complexing agent selected for the present invention.

In one embodiment of the present invention, the second step involves filtration of the aluminum hydroxide solution prepared by hydrolysis reaction using a filtration method such as regular filtration under reduced pressure, pressurized filtration, precipitation separation, and centrifugal filtration, or combination thereof, to obtain an aluminum hydroxide filter cake, and then wash of the resulting cake with deionized water to remove residual catalyst(s), complexing agent(s) and metal impurity components adhering on the surface of the material. The quantity of the deionized water used for wash is 1 to 100 times the weight of the solid aluminum hydroxide. The waste solution obtained from wash of the filter cake is reused as the deionized water starting material after precipitation and purification treatments. The washed filter cake is dried at a high temperature to obtain high purity aluminum hydroxide solid.

The analysis of metal element impurities in the high purity aluminum hydroxide was conducted according to the following method: 0.5 g of aluminum hydroxide was dissolved in 10 ml of 10 mol/L aqueous HCl solution and diluted to 25 ml, and was analyzed using a PerkinElmer Optima7000 DV Series ICP-OES (Inductively Coupled Plasma Spectrometer), and a plasma atomic emission spectrometry (ICP) for metal element analysis. The analytical methods may refer to the industrial standard SNT 2081-2008. In one embodiment of the present invention, the sum of all the metal element impurities obtained is calculated as the content of metal impurities.

In another aspect the present invention provides use of the high purity aluminum hydroxide prepared by the method described above as the starting material for the production of high-purity alumina.

The aluminum hydroxide product prepared according to the present invention described above, through analysis of the metal element impurity content, is found to contain metal element impurities less than 5 ppm; therefore, the purity of the resultant aluminum hydroxide product is high, and can be used as the starting material to produce high purity aluminum oxide in the manufacture of high purity alumina.

The present invention is characterized by addition of complexing agent(s) to the reaction process, in which the complexing agent(s) would react with the trace amounts of the undesired non-aluminum metal element impurities in the aluminum starting material, the free non-aluminum metal ions in the solution, and other non-aluminum meal ions adhering to the surface of the aluminum hydroxide, through complexation to form water soluble complexes, and then use of filtration, wash, and other steps to remove metal ions to improve the purity of the aluminum hydroxide product. In the mean time, the production process of the present invention is simple, involving only adding materials, filtering reaction solution, washing filter cake, and cake drying filter cake, a total of four steps to obtain the product, with low cost and no environmental pollutions.

In another aspect, the present invention provides a method to prepare high purity aluminum oxide, the method comprising the following steps:

Step 1, calcining the high purity aluminum hydroxide prepared by the high purity aluminum hydroxide method provided in the present invention, to obtain aluminum oxide.

Step 2, washing the aluminum oxide obtained from step 1 with a washing solution, with the wash time from about 10 minutes to about 100 hours and the mass ratio between aluminum oxide and the washing solution in the range of about 1:1-1:100, followed by filtration and drying to yield high purity aluminum oxide solid.

In one embodiment of the present invention, the calcining temperature and calcining time in step 1 are important conditions to calcine aluminum hydroxide and convert it into aluminum oxide. The calcine temperature is preferably 400-1700° C., more preferably 600-1200° C., and even more preferably 700-1000° C.; the calcine time is preferably 0.5-168 hours, more preferably 5-100 hours, and even more preferably 20-50 hours.

To improve the purity of the aluminum oxide, in one embodiment of the present invention, the aluminum oxide powder prepared by the above method is washed with washing a solution is remove non-aluminum metal ions. In the present invention, non-aluminum metal ions can be removed using the following three methods.

The first method: dissolution after reaction. Some compounds of metal ions are difficult to be dissolved in the deionized water or organic solvents, but after reaction with acids, bases, or salts, are soluble in the deionized water or organic solvents; therefore, these types of metal ions can be dissolved by adding the aluminum oxide powder into aqueous or organic solutions of acids, bases, or salts for metal ions in which the metal ions react with the acids, bases or salts for form soluble compounds, while aluminum oxide powder does not react, in order to achieve purification.

The second method: dissolution after complexation. Some metal ion compounds cannot dissolve after reaction even in the aqueous or organic solutions of acids, bases or salts; then complex agents can be added to form complexes with these metal ions to make them dissolve in the deionized water or organic solvents.

The third method: calcination and wash with deionized water. The crystal structure arrangement of the aluminum hydroxide is not uniform, in which aluminum ions are distributed in the crystal irregularly, and thus easily resulting in the formation of local negative charges to which other impurity ions can easily be adsorbed. Aluminum hydroxide has large inner surface area and contains porous structures, which can also easily adsorb other impurity ions. After high temperature calcination, the aluminum oxide crystal structure arrangement is uniform and will not cause local negative charges, and in the meantime, its specific surface area becomes smaller, and the porous structure is changed, which makes other impurity ions originally absorbed in the inner surface migrate out, which, followed by the washing with deionized water to remove the impurity metal ions, achieves purification.

In the present invention, the washing liquid is preferably selected from deionized water, inorganic acid solutions, organic acid solutions, organic base solutions, salt solutions with cations being non-metal ions, and aromatic hydrocarbons, or a combination thereof. Among these, a pure water as washing liquid has relatively good solubility for Na and K elements, and can greatly reduce the content of Na and K elements; the acidic washing solutions have relatively good selectivity for Fe, Mg, and Ca elements, and can dissolve more Fe, Mg, Ca impurities by reactions; basic washing solutions have relatively good selectivity for Zn element, and basic washing solutions such as ammonium water can form complexes with Zn to facilitate dissolution; since different washing solutions have clearly selective purification effects towards different metal elements, use of a combination of various washing solutions having different selectivity can remove more metal element impurities.

In step 2, the mass ratio of aluminum oxide to the washing liquid is an important factor to the purity of aluminum oxide. Among these, if too high a mass ratio between aluminum oxide to the washing liquid may result in a too low purity of the aluminum oxide; too low a mass ratio between aluminum oxide to the washing liquid may result in waste of the liquid. The mass ratio between aluminum oxide and the washing solution is controlled at 1:1-1:100 in the present invention, preferably 1:5-1:40, more preferably 1: 10-1:30.

The washing duration and times are another important factor to the purity of aluminum oxide. Too short a washing duration and two few times of washing will result in low purity of aluminum oxide; too long a washing duration and too many times of washing will result in wasting energy resource. The washing duration in the present invention is preferably 10 minutes to 100 hours, more preferably 1-60 hours. The washing procedure can be using one washing solution or using multiple washing solutions in the same washing operation, with total washing times between 1-500 times, preferably 30-400 times, more preferably 100-300 times; and it also can use different washing liquids in a comprehensive washing operation, total washing times set to be 1-500 times, preferably 30-400 times, more preferably 100-300 times.

After washing is complete, the washed slurry is filtered, and the filter cake is dried to yield aluminum oxide. In the present invention the control of water content is by controlling the drying time, and the water content is measured by the method of atmospheric drying until constant weight. Specifically, the drying step preferably uses drying oven, drying room, flash evaporating drying apparatus, microwave drying apparatus, or a combination thereof.

The analysis on the content of metal element impurities for the high purity aluminum oxide was carried out according to the following method: dissolving 0.5 g aluminum oxide in 10 ml of 10 mol/L aqueous HCl solution and diluting it to 25 ml aqueous solution, and analyzing it with PerkinElmer Optima7000 DV Series ICP-OES (Inductively Coupled Plasma spectrometer), and using plasma atomic emission spectrometry (ICP) for metal element analysis, with the analytical methods described in the industry standard SNT 2081-2008 as a reference. In the working examples of the present invention the sum of all measured metal elements is calculated as the content of metal impurities.

The term "aliphatic group," as used herein, means a group formed from a non-aromatic hydrocarbon by loss of a hydrogen atom, which can be chain-type or cyclic, saturated or unsaturated. Examples include, but are not limited to, alkyl, alkenyl, cycloalkyl, or the like. An aliphatic group may be substituted by one or more other substituents.

The term "alkyl," as used herein, means a straight or branched-chain saturated hydrocarbon group containing from 1 to 10 carbon atoms, preferably 1 to 8 carbon atoms, sometimes more preferably 1 to 6 carbon atoms, and sometimes more preferably 1 to 4 carbon atoms, which is connected with the rest of the molecular moiety through a single bond. Representative examples of alkyl include, but are not limited to, methyl, ethyl, n-propyl, iso-propyl, n-butyl, sec-butyl, iso-butyl, tert-butyl, etc.

The term "alkoxy," as used herein, means an "—O-alkyl" group, where alkyl is as defined herein. Representative examples of alkoxy include, but are not limited to, methoxy, ethoxy, propoxy, 2-propoxy, butoxy, tert-butoxy, etc.

The term "aryl," as used herein, means an aromatic hydrocarbon group comprised of 6 to 14 carbon atoms formed from an aromatic hydrocarbon by loss of a hydrogen atom. Representative examples of aryl include, but are not limited to, phenyl and naphthyl. Unless specified in the present application, the term "aryl" may be substituted by one or more substituents, such as $C_1$-$C_6$ alkyl, $C_1$-$C_6$ haloalkyl, $C_1$-$C_6$ alkoxy, etc.

The term "arylalkyl," as used herein, means alkyl group substituted by one or more aryl groups, wherein alkyl and aryl are as defined herein. Representative examples of arylalkyl include, but are not limited to, benzyl, 2-phenyl-ethyl, diphenylmethyl, and naphth-2-ylmethyl, etc.

The term "carboxyl," as used herein, means a —C(O)O$^-$ or —CO$_2$H group.

The term "cycloalkyl," as used herein, means a cyclic hydrocarbon group containing from 3 to 8 carbon atoms, preferably 3 to 6 carbon atoms, where such groups can be saturated or unsaturated, but not aromatic. In certain embodiments, cycloalkyl groups are preferably fully saturated. Examples of cycloalkyl include, but are not limited to, cyclopropyl, cyclobutyl, cyclopentyl, cyclohexyl, cyclohexenyl, etc.

The singular forms "a", "an", and "the" include plural reference unless the context clearly dictates otherwise. For example, "a catalyst" may include one, two, or more catalysts. On the other hand, depending on situation, the term "several" may also include one, two, etc.

In further embodiments, the present invention provides methods and processes for making high purity aluminum hydroxide and high purity aluminum oxide, comprising all reasonable combinations of suitable conditions of any other embodiments as well as the illustrative working examples described herein.

In the following are provided some non-limiting working examples to further illustrate certain aspects of the present invention.

EXAMPLES

Working Example 1

To a 2000 mL four-necked flask was added deionized water (1300 g), followed by addition of 0.75 g tetramethylammonium hydroxide [(CH$_3$)$_4$N$^+$OH$^-$], 75.75 g NH$_4$F and 123.5 g 99.95% pure aluminum chips, and the mixture was stirred to be uniform, the reaction mixture measured to have a pH value greater than 7. The reaction was allowed to continue for 68 hours while the internal temperature of the reaction system was kept at 95° C. with sufficient agitation and refluxing, then the reaction mixture was filtered under reduced pressure, and the aluminum hydroxide filter cake was washed with 3567 g of deionized water and dried to yield 355 g of solid aluminum hydroxide. By ICP measurement, the sum of the non-aluminum metal element impurities plus silicon element content in the aluminum hydroxide product was 0.0004%. The high purity aluminum hydroxide thus obtained was calcined and dehydrated at 900° C. in a crucible for 168 hours to yield 232 g aluminum oxide. The resultant aluminum oxide powder was added into a Teflon® washing bucket, followed by addition of 1160 g washing liquid containing ammonium water of 1% concentration by mass, and agitate at room temperature for 6 hours, followed by filtration under reduced pressure, and the filter cake was dried in an oven to yield 231.4 g aluminum oxide. By ICP measurement, the sum of the non-aluminum metal element impurities plus silicon element content was 0.0009%.

Working Example 2

To a 2000 mL four-necked flask was added deionized water (895 g), followed by addition of 5 g tetrapropylammonium hydroxide [(CH$_3$CH$_2$CH$_2$)$_4$N$^+$OH$^-$], 300 g NH$_3$ and 300 g 99.99% pure metal aluminum sheet, and the mixture was stirred to be uniform, with the pH value of the mixture measured to be greater than 9. The reaction was allowed to continue for 168 hours while the internal temperature of the reaction system was kept at 55° C. with sufficient agitation and mixing. The reaction mixture was filtered under reduced pressure to obtain an aluminum hydroxide filter cake, which was washed with 17300 g of deionized water and dried to obtain 865 g of solid aluminum hydroxide. By ICP measurement, the sum of the non-aluminum metal element impurities plus silicon element content in the aluminum hydroxide product was 0.00033%. The resultant high purity aluminum hydroxide was calcined and dehydrated at 1700° C. in a crucible for 16 hours to obtain 564.9 g aluminum oxide. The resultant aluminum oxide was added into a Teflon® washing bucket, followed by addition of 22596 g deionized water and agitation at room temperature for 10 minutes, and filtration under reduced pressure. Washing was repeated 500 times, and the filter cake was dried in an oven to yield 560 g aluminum oxide. By ICP measurement, the sum of the non-aluminum metal element impurities plus silicon element content was 0.00078%.

Working Example 3

To a 2000 mL four-necked flask was added deionized water (965 g), followed by addition of 75 g tetraethylammonium hydroxide [(CH$_3$CH$_2$)$_4$N$^+$OH$^-$], 10 g ethyl-diaminetetraacetic acid (EDTA), and 450 g 99.996% pure metal aluminum powder, and the mixture was stirred to uniform, with the pH of the reaction mixture measured to be greater than 9. The reaction continued for 10 hours while the internal temperature of the reaction system was kept at 76° C. with sufficient agitation and refluxing, and the reaction mixture was filtered under reduced pressure, and the aluminum hydroxide filter cake was washed with 26000 g deionized water and dried to obtain 1298 g of solid aluminum hydroxide. By ICP measurement, the sum of the non-aluminum metal element impurities plus silicon element content in the aluminum hydroxide product was 0.00045%. The resultant aluminum hydroxide was calcined and dehydrated at 1050° C. in a crucible for 24 hours to yield 848.5 g aluminum oxide. The resultant aluminum oxide was added into a Teflon® washing bucket, washed with 3381 g of 1.5% (mass) aqueous hydrochloric acid washing solution, agitated at room temperature for 30 minutes, followed by filtration under reduced pressure. The washing procedure was repeated 5 times, and the filter cake was dried in an oven to yield 848 g aluminum oxide. By ICP measurement, the sum of the non-aluminum metal element impurities plus silicon element content was 0.00098%.

Working Example 4

To a 2000 mL four-necked flask was added deionized water (1446.25 g), followed by addition of 13 g of benzyltrimethylammonium hydroxide [$C_6H_5CH_2(CH_3)_3N^+OH^-$], 0.75 g ethylene glycol bis(β-diaminoethyl) ether N,N,N',N'-tetraacetic acid and 40 g of 99.992% pure metal aluminum scraps, and the mixture was stirred to be uniform, with the pH of the mixture measured to be greater than 8. The reaction continued for 1 hour while the internal temperature of the reaction system was kept at 99.9° C. with sufficient agitation and refluxing, and the reaction mixture was filtered under reduced pressure, and the resultant aluminum hydroxide filter cake was washed with 155.6 g deionized water, which was dried to yield 155 g of solid aluminum hydroxide. By ICP measurement, the sum of the non-aluminum metal element impurities plus silicon element content in the aluminum hydroxide product was 0.00039%. The aluminum hydroxide was calcined and dehydrated at 400° C. in a crucible for 100 hours to yield 101.1 g of aluminum oxide. The resultant aluminum oxide was added into a Teflon® washing bucket, to which was added 2033 g of 0.5% (mass) aqueous oxalic acid washing solution and 8077 g of 1% (mass) aqueous $HNO_3$ washing solution, agitated at room temperature for 100 hours, and filtered under reduced pressure; and the filter cake was dried in an oven to yield 100.5 g of aluminum oxide. By ICP measurement, the sum of the non-aluminum metal element impurities plus silicon element content was 0.00095%.

Working Example 5

To a 2000 mL four-necked flask was added deionized water (1477 g), followed by addition of 3 g (2-hydroxyethyl) trimethylammonium hydroxide [$(CH_3)_3(HOCH_2CH_2)N^+OH^-$], 5 g oxalic acid and 15 g 99.99% pure metal aluminum wire, and the mixture was stirred to uniform, with the pH value measured to be greater than 7. The reaction was allowed to proceed for 22 hours while the internal temperature of the reaction system was kept at 30° C. with sufficient agitation and refluxing, and the reaction mixture was filtered under reduced pressure, and the aluminum hydroxide filter cake was washed with 1083 g deionized water and dried to yield 42.7 g solid aluminum hydroxide. By ICP measurement, the sum of the non-aluminum metal element impurities plus silicon element content in the aluminum hydroxide product was 0.00049%. The resultant aluminum hydroxide was calcined and dehydrated at 1350° C. in a crucible for 0.5 hours to yield 27.9 g aluminum oxide. The resultant aluminum oxide was added into a Teflon® washing bucket, washed with 418.5 g of 0.5% (mass) aqueous ammonium fluoride washing solution, and after stirring at room temperature for 1.5 hours filtered under reduced pressure. The washing step was repeated 3 times with ethylbenzene as the washing liquid to replace aqueous ammonium fluoride. Then, washing was repeated 100 times with deionized water as the washing liquid to replace ethylbenzene. The filter cake was then dried in oven to yield 26.2 g aluminum oxide. By ICP measurement, the sum of non-aluminum metal element impurities plus silicon element content was 0.00075%.

Working Example 6

To a 2000 mL four-necked flask was added deionized water (1150 g), followed by addition of 150 g tetrapropylammonium hydroxide [$(CH_3CH_2CH_2)_4N^+OH^-$], 93 g triethanolamine and 107 g 99.995% pure metal aluminum sheet, and stirred to uniform, with the pH value of the mixture measured to be greater than 9. The reaction was allowed to proceed for 16 hours while the internal temperature of the reaction system was kept at 66° C. with sufficient agitation and refluxing, and the reaction mixture was filtered under reduced pressure and the aluminum hydroxide filter cake was washed with 9891.5 g deionized water and dried to yield 308.4 g solid aluminum hydroxide. By ICP measurement, the sum of non-aluminum metal element impurities plus silicon element content in the aluminum hydroxide product was 0.00044%. The filter cake was calcined and dehydrated at 1200° C. in a crucible for 3.5 hours to yield 201.2 g aluminum oxide. The resultant aluminum oxide was added into a Teflon® washing bucket, followed by addition of 3524 g of 1.5% (mass) aqueous oxalic acid washing solution and 500 g of 1% (mass) aqueous acetic acid washing solution, agitation at room temperature for 4 hours, and filtration under reduced pressure. The filter cake was dried in an oven to yield 200.3 g aluminum oxide. By ICP measurement, the sum of non-aluminum metal element impurities plus silicon element content was 0.00087%.

Working Example 7

To a 2000 mL four-necked flask was added deionized water (1126 g), followed by addition of 59 g tetramethylammonium hydroxide [$(CH_3)_4N^+OH^-$], 41 g poly(tetramethylene-1,2,4-tricarboxylic acid) and 274 g 99.98% pure metal aluminum chips, and the mixture was stirred to uniform, with the pH value of the mixture measured to be greater than 7. The reaction mixture was stirred for 7 hours while the internal temperature of the reaction system was kept at 83° C. with sufficient agitation and refluxing, and the reaction mixture was filtered under reduced pressure and the aluminum hydroxide filter cake was washed with 10290 g deionized water and dried to yield 790.2 g solid aluminum hydroxide. By ICP measurement, the sum of non-aluminum metal element impurities plus silicon element content in the aluminum hydroxide product was 0.00041%. The resultant aluminum hydroxide was calcined and dehydrated at 1100° C. in a crucible for 85 hours to yield 516.5 g aluminum oxide. The aluminum oxide was added into a Teflon® washing bucket, followed by addition of 516.5 g toluene washing liquid, agitation at room temperature for 1 hour, and filtration under reduced pressure, and the filter cake was dried in an oven to yield 516.1 g aluminum oxide. By ICP measurement, the sum of non-aluminum metal element impurities plus silicon element content was 0.00099%.

Working Example 8

To a 2000 mL four-necked flask was added deionized water (1251 g), followed by addition of 29 g trimethylphenylammonium hydroxide [$(CH_3)_3C_6H_5N^+OH^-$], 101 g diethylenetriaminepentaacetic acid and 119 g 99.99% pure metal aluminum scraps, and the mixture was stirred to uniform, with the pH value of the mixture measure to be greater than 7. The reaction was allowed to proceed for 14 hours while the internal temperature of the reaction system was kept at 77° C. with sufficient agitation and refluxing, and the reaction mixture was filtered under reduced pressure and the aluminum hydroxide filter cake was washed with 7219 g deionized water and dried to yield 343 g solid aluminum hydroxide. By ICP measurement, the sum of the non-aluminum metal element impurities plus silicon element content in the aluminum hydroxide product was 0.00046%. The resultant aluminum hydroxide was calcined and dehydrated at 1200° C. in a crucible for 3 hours to yield 224 g aluminum oxide. The resultant aluminum oxide powder was added into a Teflon® washing bucket, followed by addition of 1904 g dimethylbenzene (xylene) washing liquid and 5040 g of 1.5% (mass) aqueous hydrochloride washing solution and 4256 g of 2% (mass) aqueous formic acid washing solution, agitation at room temperature for 2 hours, and filtration under reduced pressure. The washing step was repeated 25 times. The filter cake was dried in an oven to yield 223.6 g aluminum oxide. By ICP measurement, the sum of non-aluminum metal element impurities plus silicon element content was 0.00069%.

Working Example 9

To a 2000 mL four-necked flask was added deionized water (1312 g), followed by addition of 17 g tetrapropylammonium hydroxide [$(CH_3CH_2CH_2)_4N^+OH^-$], 20 g tetramethylammonium hydroxide [$(CH_3)_4N^+OH^-$], 12 g ethylenediaminetetraacetic acid, 51 g $NH_4SCN$, and 88 g 99.992% pure metal aluminum scraps, and the mixture was stirred to uniform, with the pH value of the mixture measured to be greater than 8. The reaction was allowed to proceed for 20 hours while the internal temperature of the reaction system was kept at 55° C. with sufficient agitation and refluxing, and the reaction mixture was filtered under reduced pressure and the aluminum hydroxide filter cake was washed with 7627 g deionized water and dried to yield a 253.7 g solid aluminum hydroxide. By ICP measurement, the sum of non-aluminum metal element impurities plus silicon element content in the aluminum hydroxide product was 0.00048%.

Working Example 10

To a 2000 mL four-necked flask was added deionized water (1152 g), followed by addition of 25 g tetramethylammonium hydroxide [$(CH_3)_4N^+OH^-$], 20 g (2-hydroxyethyl)trimethylammonium hydroxide [$(CH_3)_3(HOCH_2CH_2)N^+OH^-$], 72 g diethanolamine, 9 g ethylenediaminetetraacetic acid and 222 g 99.992% pure metal aluminum scraps, and the mixture was stirred to uniform, with the pH value of the mixture measured to be greater than 9. The reaction was allowed to proceed for 12 hours while the internal temperature of the reaction system was kept at 47° C. with sufficient agitation and refluxing, and the reaction mixture was filtered under reduced pressure and the aluminum hydroxide filter cake was washed with 28219 g deionized water and dried to yield 640.1 g solid aluminum hydroxide. By ICP measurement, the sum of non-aluminum metal element impurities plus silicon element content in the aluminum hydroxide product was 0.00047%.

Working Example 11

To a 2000 mL four-necked flask was added deionized water (1268 g), followed by addition of 3 g tetraethylammonium hydroxide [$(CH_3CH_2)_4N^+OH^-$], 17 g poly(tetramethylene-1,2,4-tricarboxylic acid), 23 g pyrophosphates, 9 g nitrilotriacetic acid sodium and 180 g 99.99% pure metal aluminum scraps, and the mixture was stirred to uniform, with the pH value of the mixture measured to be greater than 8. The reaction was allowed to proceed for 19 hours while the internal temperature of the reaction system was kept at 80° C. with sufficient agitation and refluxing, and the reaction mixture was filtered under reduced pressure and the aluminum hydroxide filter cake was washed with 15080 g deionized water and dried to yield 518.8 g solid aluminum hydroxide. By ICP measurement, the sum of non-aluminum metal element impurities plus silicon element content in the aluminum hydroxide product was 0.00036%.

For the high purity aluminum hydroxide product prepared in Examples 1-11, the total sum of non-aluminum metal element impurities plus silicon element content was less than 0.0005%, which meets the purity requirement for the starting material in the manufacturing of high purity aluminum oxide. For the high purity aluminum oxide prepared in Examples 1-8, the total sum of non-aluminum metal element impurities plus silicon content was no more than 0.001%, meeting customer demand.

The sequence of the foregoing working examples was provided solely for the convenience of illustration, which does not represent advantages or disadvantages of these examples.

In the foregoing are provided only certain preferred embodiments of the present invention for illustration purpose, and they are not intended to limit the scope of present invention. As a person of ordinary skill in the art would understand, certain conditions or parameters of the methods disclosed in this application, such as reaction temperatures, reaction times, reagent ratios and concentrations, rinsing solution volumes and times, or the like, may be varied to a certain degree to achieve equivalent results or even further optimized to obtain improved results based on the disclosure herein and general knowledge in the field. Therefore, any modifications, equivalent replacements, and improvements within the spirit and principle of the present invention are contemplated herein and considered to be within the scope of the present invention.

The invention claimed is:

1. A method of preparing high purity aluminum hydroxide, comprising reacting an aluminum starting material with water in the presence of one or more catalyst(s) and one or more complexing agent(s) to form a reaction mixture, wherein said one or more complexing agent(s) react with non-aluminum metal impurities to form soluble complexes for removal, and wherein said catalyst(s) are quaternary ammonium hydroxide base(s).

2. The method of claim 1, wherein said quaternary ammonium hydroxide base(s) have a molecular formula of $R^1R^2R^3R^4N^+OH^-$, wherein $R^1$, $R^2$, $R^3$, and $R^4$ are each independently selected from the group consisting of alkyl, aryl, and arylalkyl, each optionally substituted.

3. The method of claim 1, wherein said quaternary ammonium hydroxide base(s) are independently selected from the group consisting of tetramethylammonium hydroxide, tetraethylammonium hydroxide, tetrapropylammonium hydroxide, (2-hydroxyethyl)trimethylammonium hydroxide, benzyltrimethylammonium hydroxide, trimethylphenylammonium hydroxide, and combinations thereof.

4. The method of claim 1, wherein said one or more complexing agent(s) are each independently selected from the group consisting of inorganic complexing agents, organic complexing agents, and combinations thereof.

5. The method of claim 4, wherein said inorganic complexing agents are selected from the group consisting of HCl, $NH_4SCN$, $NH_4F$, $NH_3$, polycyanic acids, polycyanates, pyrophosphates, polyphosphates, and combinations thereof.

6. The method of claim 4, wherein said organic complexing agents are selected from the group consisting of amino-carboxylic acids, hydroxyl amino-carboxylic acids, carboxyl carboxylic acids, alcohol amines, polymers, and combinations thereof.

7. The method of claim 1, comprising the steps of:
(1) mixing the aluminum starting material, the one or more quaternary ammonium hydroxide base(s), the one or more complexing agent(s), and water to form a reaction mixture and agitating the reaction mixture, wherein the aluminum starting material reacts with water to form an aluminum hydroxide suspension;
(2) filtering the aluminum hydroxide suspension to obtain an aluminum hydroxide filter cake; and
(3) washing the filter cake with a washing liquid and drying the filter cake.

8. The method of claim 1, wherein said reaction mixture is maintained at a temperature from about 30° C. to about 99.9° C. while stirring.

9. The method of claim 1, wherein said reaction is allowed to continue for about 1-168 hours or until all the aluminum starting material is substantially consumed.

10. The method of claim 1, wherein the masses of aluminum starting material, catalyst(s), and complexing agent(s) are about 1%-30%, about 0.05%-10%, and about 0.05%-20%, respectively, by weight of the total reaction mixture.

11. The method of claim 1, wherein the aluminum starting material is in a form selected from the group consisting of aluminum sheets, aluminum chips, aluminum powders, aluminum scraps, aluminum wires, and combinations thereof.

12. The method of claim 1, wherein the aluminum starting material contains 99.95%-100% of aluminum by weight.

13. The method of claim 7, wherein the quaternary ammonium hydroxide base(s) have a molecular formula of $R^1R^2R^3R^4N^+OH^-$, wherein $R^1$, $R^2$, $R^3$, and $R^4$ are each independently selected from the group consisting of alkyl, aryl, and arylalkyl, each optionally substituted.

14. The method of claim 13, wherein said quaternary ammonium hydroxide base(s) contain less than 10 ppm of non-aluminum metal element impurities and silicon element content by weight combined.

15. The method of claim 7, wherein the quaternary ammonium hydroxide base(s) are selected from the group consisting of tetramethylammonium hydroxide, tetraethylammonium hydroxide, tetrapropylammonium hydroxide, (2-hydroxyethyl)trimethylammonium hydroxide, benzyltrimethylammonium hydroxide, trimethylphenyl ammonium hydroxide, and combinations thereof.

16. The method of claim 7, wherein the complexing agent(s) are selected from the group consisting of inorganic complexing agents, organic complexing agents, and combinations thereof.

17. The method of claim 16, wherein the inorganic complexing agents are selected from the group consisting of HCl, $NH_4SCN$, $NH_4F$, $NH_3$, polycyanic acids, polycyanates, pyrophosphates, polyphosphates, and combinations thereof.

18. The method of claim 16, wherein the organic complexing agents are selected from the group consisting of amino-carboxylic acids, hydroxyl amino-carboxylic acids, carboxylic acids, alcohol amines, polymers, and combinations thereof.

19. The method of claim 18, wherein the amino-carboxylic acid is selected from the group consisting of ethylenediaminetetraacetic acid (EDTA), EDTA salts, diethylenetriaminepentaacetic acid (DETPA), DETPA salts, nitrilotriacetic acid (NTA), NTA salts, and combinations thereof; the hydroxyl amino-carboxylic acid is selected from the group consisting of hydroxyethylenediaminetetraacetic acid (HEDTA), ethylene glycol bis(β-diaminoethyl) ether N, N, N', N'-tetraacetic acid, dihydroxyglycine, and combinations thereof; the carboxylic acid is selected from the group consisting of oxalic acid, tartaric acid, citric acid, gluconic acid, 2-hydroxylcarbonylmethyl-2-hydroxymalonic acid, (2-hydroxyethyl)aminoacetic acid, and combinations thereof; the alcohol amine is selected from the group consisting of diethanolamine, triethanolamine, and a combination thereof; and the polymer is selected from the group consisting of poly(4-hydroxytetramethylene-1,2-dicarboxylic acid), poly(tetramethylene-1,2,4-tricarboxylic acid), and a combination thereof.

20. The method of claim 7, wherein said filtering in step (2) comprises use of a plate-and-frame pressure filter, centrifuge, bag filter, or a combination thereof; and said washing in step (3) comprises use of deionized water to wash the filter cake to remove residual organic bases and complexing agents in the filter cake.

21. The method of claim 20, wherein the mass ratio of the deionized water and the filter cake in said washing is from about 1:1 to about 1:100.

22. A method of preparing high purity aluminum oxide, comprising the steps of:
(1) calcining the high purity aluminum hydroxide prepared according to the method of claim 1 to obtain aluminum oxide;
(2) washing the aluminum oxide prepared in step (1) with a washing liquid to remove non-aluminum metal impurities and silicon-containing impurities;
(3) filtering to collect an aluminum oxide filter cake;
(4) optionally repeating steps (2) and (3) until all the non-aluminum metal element impurities are substantially removed; and
(5) drying the aluminum oxide filter cake to obtain high purity aluminum oxide.

23. The method of claim 22, wherein said calcining is conducted at a temperature in the range from about 400° C. to about 1700° C. for a duration in the range from about 0.5 hours to about 168 hours.

24. The method of claim 22, wherein said washing liquid is selected from the group consisting of deionized water, inorganic acid solutions, organic acid solutions, organic base solutions, solutions of non-metal cation salts, aromatic hydrocarbons, and combinations thereof.

25. The method of claim 22, wherein said washing lasts for a duration from about 10 minutes to about 100 hours, and the mass ratio of the aluminum oxide product to the washing liquid is in the range of about 1:1-1:100.

26. The method of claim 22, wherein said drying in step (5) is conducted in a drying oven, drying room, flash evaporation drying apparatus, microwave drying apparatus, or a combination thereof.

* * * * *